United States Patent
Houtman et al.

(10) Patent No.: US 8,817,603 B2
(45) Date of Patent: Aug. 26, 2014

(54) SATELLITE-BASED MESSAGING SYSTEM

(75) Inventors: Tom Houtman, Ottawa (CA); Brian Armbruster, Ottawa (CA); Ron Territo, Ottawa (CA); Zhenhong Cheng, Renfrew (CA); Wayne McPherson, Ottawa (CA); Sean Faulkner, Kanata (CA)

(73) Assignee: Skywave Mobile Communications Inc., Ottawa, ON (CA)

( * ) Notice: Subject to any disclaimer, the term of this patent is extended or adjusted under 35 U.S.C. 154(b) by 139 days.

(21) Appl. No.: 13/536,340

(22) Filed: Jun. 28, 2012

(65) Prior Publication Data
US 2013/0021900 A1 Jan. 24, 2013

Related U.S. Application Data

(60) Provisional application No. 61/509,276, filed on Jul. 19, 2011, provisional application No. 61/509,550, filed on Jul. 19, 2011.

(51) Int. Cl.
| | |
|---|---|
| H04W 4/12 | (2009.01) |
| H04B 7/204 | (2006.01) |
| H04B 7/185 | (2006.01) |
| H04W 72/04 | (2009.01) |

(52) U.S. Cl.
CPC .......... H04B 7/18576 (2013.01); H04B 7/2041 (2013.01)
USPC .......................................... 370/225; 370/316

(58) Field of Classification Search
CPC ............ H04B 7/18576; H04B 7/2041; H04M 1/6075; H04M 1/72577; H04M 2250/12; H04W 4/02; H04W 4/026; H04W 4/12; H04W 74/08; H04W 72/04
USPC ........................... 370/254–350; 709/201–213
See application file for complete search history.

(56) References Cited

U.S. PATENT DOCUMENTS

| | | | | |
|---|---|---|---|---|
| 5,065,398 | A * | 11/1991 | Takashima | 370/230 |
| 5,991,279 | A * | 11/1999 | Haugli et al. | 370/311 |
| 6,052,561 | A * | 4/2000 | Rudowicz et al. | 455/13.1 |
| 6,735,440 | B2 * | 5/2004 | Wiedeman et al. | 455/429 |
| 2004/0014472 | A1 | 1/2004 | de La Chapelle et al. | |
| 2006/0035588 | A1 * | 2/2006 | Chapelle | 455/13.3 |
| 2007/0243822 | A1 * | 10/2007 | Monte et al. | 455/12.1 |

FOREIGN PATENT DOCUMENTS

| | | |
|---|---|---|
| EP | 1052869 A2 | 11/2000 |
| EP | 1231743 A3 | 6/2004 |
| WO | 96/20538 A2 | 7/1996 |

* cited by examiner

*Primary Examiner* — Ayaz Sheikh
*Assistant Examiner* — Debebe Asefa
(74) *Attorney, Agent, or Firm* — Marks & Clerk

(57) ABSTRACT

In a satellite-based messaging system messages are exchanged between a ground station and mobile terminals over a wide geographic area covered by multiple satellite beams. Each beam contains one or more carrier frequencies. A message processing center is configured to provision a frame comprising a plurality of subframes to carry data over a forward link to the mobile terminals; hop between beams in the forward link and assign each subframe within a frame to a specific satellite beam; provision a transport medium in the form of virtual carriers each defined by one or more carrier frequency/beam hop combinations, wherein each virtual carrier is assigned a unique virtual carrier identifier; and notify the mobile terminals of carrier frequency/hop combinations for assigned virtual carrier identifiers.

29 Claims, 6 Drawing Sheets

SATELLITE-BASED MESSAGING SYSTEM

CROSS REFERENCE TO RELATED APPLICATION

This application claims the benefit under 35 USC 119(e) of U.S. provisional applications Nos. 61/509,550 and 61/509,276, both filed Jul. 19, 2011, the contents of which are herein incorporated by reference.

FIELD OF THE INVENTION

This invention relates to the field of mobile telecommunications, and in particular a satellite-based messaging system for use with mobile terminals.

BACKGROUND OF THE INVENTION

Cell phones provide mobile coverage over a limited geographic area. There is a need, for example in the trucking and shipping industries, to maintain coverage over wide geographic area without reliance on the presence of a cell phone service.

Satellite-based mobile messaging systems are known that allow the two-way communication of short data messages between a mobile terminal and control center via satellite. Such systems, for example, can send data concerning cargo, such as status and GPS location, back to a command center, and can allow short data messages to be transmitted back to the driver.

A mobile messaging system is described in U.S. Pat. No. 5,991,279, the contents of which are herein incorporated by reference. While this system provides an effective means of communication between remote terminals and a command center using satellite links, the very success of this system means that as the volume of terminals increases, there are increasing demands on available satellite bandwidth. It is thus desirable to utilize bandwidth efficiently in implementing the system. Moreover, since such terminals often travel over a very wide geographic area, for example, across the continental United States or an ocean. Also, power usage is an issue, especially in satellite communications.

SUMMARY OF THE INVENTION

According to the present invention there is provided a satellite-based messaging system wherein messages are exchanged between a ground station and mobile terminals over a wide geographic area covered by multiple satellite beams, and wherein each beam contains one or more carrier frequencies, comprising a message processing center configured to provision a frame comprising a plurality of subframes to carry data over a forward link to the mobile terminals; hop between beams in the forward link and assign each subframe within a frame to a specific satellite beam; provision a transport medium in the form of virtual carriers each defined by one or more carrier frequency/beam hop combinations, wherein each virtual carrier is assigned a unique virtual carrier identifier; and notify the mobile terminals of carrier frequency/hop combinations for assigned virtual carrier identifiers.

In the case of low traffic beams, satellite power usage can be reduced by limiting the number of hops active for that beam. For example, in the case of three beams, a subframe, typically five seconds long, might contain ten interleaved hops, three for each beam and one blank. In the case of a low traffic beam, that beam might be assigned only one hop. The two hops released could either be assigned to other beams and left blank, in which case the overall power usage is reduced.

The use of virtual carriers in accordance with embodiments of the invention allows flexible forward/return link capacity assignment because as the network grows multiple virtual carriers can be provisioned in some beams, a single return channel can be shared by allowing terminals in multiple virtual carriers random access to the channel. A single forward channel can be shared by allocating different hops of the channel to different virtual carriers.

Embodiments of the invention offer larger payload and lower latency, system handled segmentation and reassembly, reliable delivery, and system handled packet retries and message (non) delivery notification.

In another aspect the present invention provides a mobile terminal for exchanging messages over a satellite-based messaging system with a ground station over a wide geographic area covered by multiple satellite beams, wherein each beam contains one or more carrier frequencies, wherein the messages are transmitted in the forward link in a frame comprising a plurality of subframes, wherein the subframes are hopped between beams, wherein each combination of carrier frequency and beam hop comprises a virtual carrier, and wherein each virtual carrier is assigned a unique virtual carrier identifier, and wherein the mobile terminal is configured to: store virtual carrier configurations over a wide geographic area; select a virtual carrier based on current location and stored configuration information of available virtual carriers; and attempt acquisition of the selected virtual carrier to initiate device registration and the stored configuration information.

BRIEF DESCRIPTION OF THE DRAWINGS

The invention will now be described in more detail, by way of example only, with reference to the accompanying drawings, in which.

DETAILED DESCRIPTION OF EMBODIMENTS OF THE INVENTION

Figure 1:
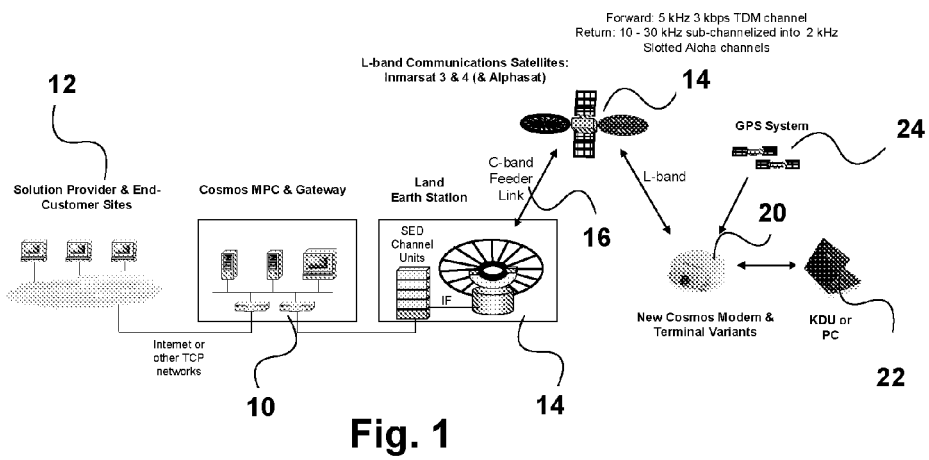
FIG. 1 is a block diagram showing the overall system architecture.

The architecture for one embodiment of a typical satellite-messaging system in accordance with embodiments of the invention is shown in FIG. 1. The system offers bidirectional messaging services from a gateway to mobile devices via Inmarsat satellite services.

The satellite service is a two-way fully acknowledged communications protocol offering a relatively low data rate and near-real time data transfer. From-mobile and to mobile messages are of variable size.

The system is suitable for applications requiring remote updates, form transfers, and text messaging combined with asset tracking. Typical applications include vessel and fleet management and security, remote surveillance, telematics and SCADA (Supervisory Control and Data Acquisition).

Gateway 10 provides a link between customer sites 12 and an earth station 14, which communicates via L-band communications satellites 14, such as Inmarsat 3 and 4 or Alphasat over a C-band feeder link 16.

The gateway 10 is responsible for converting and relaying message traffic to appropriate destinations based on mobile device and gateway account relationships established through the administrative interfaces. A gateway account is a logical connection from an SP's server. Each gateway account has identification and authentication information, similar in many ways to an e-mail account.

Each Inmarsat satellite offers several hundred narrow spot beams with coverage of about 200 kms and regional beams with coverage of about 1000 km. The satellite communicates over an L-band link 18 with modems 20 of mobile terminals, which are in turn in communication with customer equipment, such as a PC or keyboard display unit 22.

The terminals also receive positional data from Global Navigation Satellite Systems, such as GPS satellites 24. The customer sites can be end users, or added value resellers, who sell services to the ultimate users.

Figure 2:
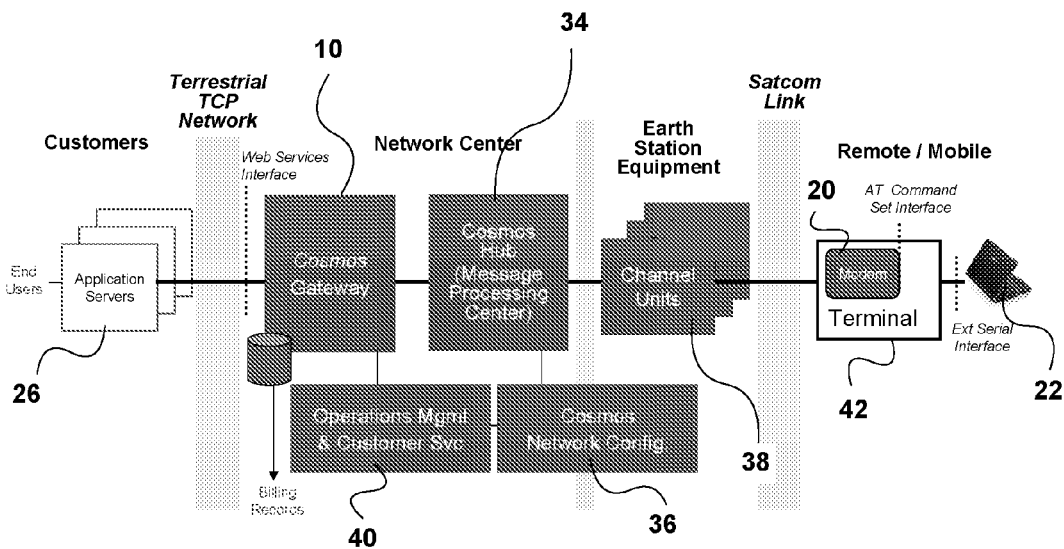
FIG. 2 is block diagram illustrating the system subsystems.

FIG. 2 shows the system architecture in some more detail. In this case the sites 12 consist of application servers 26. The gateway 10 is located in network center 32, which includes a messaging processing center 34, network configuration center 36, and operations management and customer service center 40.

The earth station equipment includes channel units 38, which create the channels to the remote terminals 42 containing modems 20. There are three basic types of satellite channel namely a bulletin board channel for system configuration, a traffic channel and a return channel.

On power-up, the mobile devices tune directly to their assigned traffic channel. They listen to the traffic channel for any system configuration updates or incoming messages. The return channel is used by a mobile device to send messages. The transmit/receive protocol ensures an incoming packet is not sent when a mobile device is transmitting.

In most cases, a mobile device gets all its system configuration updates, including the VC configuration, and pending changes to the traffic and return channel configuration on the traffic channel. However, a mobile device may miss critical system updates if it has been powered off for extended periods. In this case, the mobile device must tune to the fixed frequency bulletin board (BB) to obtain the latest system configuration information. Once the system information is obtained the mobile device tunes to the traffic channel.

In accordance with embodiments of the invention the traffic and return channels are carried on a virtual carrier comprising a return link and a forward link forming part of the L-band link 18 shown in FIG. 1. Each virtual carrier is assigned unique virtual carrier identifier, known as a VCID.

The virtual carrier (VC) is a hopped forward link carrier (i.e. time-slices of multiple forward channels) and associated return link channels combined into a single "virtual" two-way carrier. VCs are the configuration entity of the network: modems, ESE (Earth Station Equipment) and MPC (Message Processing center) all are configured based on VC configuration parameters. Each VC is identified by a VCID, which will be transmitted in the (System Information Packet) SIP (header) of every forward link subframe. Within the forward link each subframe can be carried on a different physical channel (frequency). The forward link of a virtual carrier is defined by a particular hop/frequency combination.

Each modem is registered in and uses only one VC at a time. Some VCs may be restricted to be used by only some modems ("Permitted" VCs).

The VC concept allows flexible forward/return link capacity assignment. In some beams, multiple VCs may be provisioned. A single "real" return channel can be shared by allowing modems in multiple VCs random access to the channel. A single "real" forward channel can be shared by allocating different hops of the channel to different VCs.

The forward link of a virtual carrier uses a five second frame divided into ten 0.5 second subframes, where each subframe may carry one or more data packets addressed to one or more mobile device. The return link uses slotted Aloha with ½ sec or one second time slots, with a frame size typically the same as the transmission channel, namely 5 seconds. For each terminal the forward and return link subframes do not overlap.

The mobile terminal selects an encoding and transmit rate based on a knowledge of the elevation angle to the satellite and its EIRP (Equivalent Isotropically Radiated Power) at its elevation angle and information in a beam configuration message received from the satellite, which details the sensitivity of the satellite receive subsystem for the grid of locations in the beam.

The mobile EIRP is calculated based on the EIRP vs. elevation curve for the mobile terminal's antenna. These curves are represented using a small number, for example 7, of points from which the mobile can interpolate the EIRP at its current elevation. The curves for specific antennas can be factory pre-loaded in the modem. Alternatively, customers may pre-load the EIRP curve points for their antenna into their modems.

A grid of G/T (Gain to Noise temperature ratio) information for all beams is pre-loaded at the factory. G/T information for the VC and neighbouring VCs is also broadcast in one of the system configuration messages (the Beam Coverage Definition Message) on the traffic channels if the information is updated. However, if the mobile does not have up to date G/T information for the beam it is operating in, it may still transmit in that beam but may be restricted to using only the 0.33 encoding rate until it can download the required G/T information.

To preserve bandwidth and mobile memory the G/T information grid is only for points in the beam where the mobile could be expected to use the higher encoding rates. Points where the G/T is low or at low elevation angle to the satellite will not be included in the system configuration message. The mobile will use the lowest encoding rate for locations that are not near the specified points. In order to complete the interpolation calculation, the mobile shall assume a low G/T value for unspecified points that are immediately adjacent to the provided points [this is not implemented in initial IDP release].

The mobile shall calculate the maximum encoding rate for data packet transmissions using the following algorithm. The rate shall be recalculated at least every [8] hours for mobile units or if GPS fixes are performed more frequently at any time that the mobile has moved more than [x degrees latitude plus longitude]. This algorithm can be performed at the same time as the beam table is updated and the return link offset is recalculated.

1. Locate the mobile in the G/T grid with respect to the beam centre point and using units of grid steps.
GridStepsX=Longitude in Grid Steps=(current_longitude−centre_longitude)/step_size
GridStepsY=Latitude in Grid Steps=(current_latitude−centre_latitude)/step_size Nx=X index of closet grid point west of current location=Int(GridStepsX)
Ny=Y index of closest grid point south of current location=Int(GridStepsY)
Fx=fractional part of GridStepsX=GridStepsX−Nx
Fy=fractional part of GridStepsY=GridStepsY−Ny
(Nx, Ny) is the closest grid point west and south of the current location.
GTT(Nx, Ny) is the G/T of the (Nx, Ny) grid point expressed as 0.25 db steps above −4 dB/° K. (GTT grid points are 5 bit integers representing G/T between −4.0 and 3.75 dB/° K)
Fx and Fy are the distances of the current location from the (Nx,Ny) grid point in fractions of a grid step.

2. Using bilinear interpolation estimate the G/T at the current location based on the G/T of the 4 surrounding grid points using the following formula:

GTTestimate=[GTT(Nx,Ny)(1−Fx)(1−Fy)+GTT(Nx+1,Ny)Fx(1−Fy)+GTT(Nx,Ny+1)(1−Fx)Fy+GTT(Nx+1,Ny+1)FxFy]*0.25-4.0 dB/° K If the current location is outside but adjacent to the specified grid (if some, but not all, of the GTT points used in the above equation are not specified) then the unspecified adjacent points are assumed to be −6.5 dB/° K.
If the current location is not adjacent to the specified grid then the lowest encoding rate is assumed (and the algorithm ends)

3. Calculate the elevation angle and range to the satellite from the current location. These are intermediate parameters used in the previously coded return link time offset function, CalcGeoLatency( ).
cosPhi=cos(satellite_longitude−current_longitude)*cos(current_latitude)
elevation=atan 2((cosPhi−radius_earth/radius_satellite_orbit), sqrt(1-cosPhi^2))
range=sqrt(radius_satellite_orbit2−(radius_earth^2*cos(elevation)^2))−(radius_earth*sin(elevation))
   cosPhi is an intermediate result. (It is the cosine of the angle between the satellite and the mobile measured at the earth centre.)
   elevation, satellite_longitude, current_longitude and current_latitude are in radians.
   if the elevation is less than 0° assume 0° and greater than 90° assume 90°.
   atan 2 (y, x) is the two-argument variation of the arctangent function
   range, radius_satellite and radius_earth are in km
   In the function CalcGeoLatency( ) fE is elevation and fR is range 4. Using linear interpolation estimate the EIRP of this mobile's transmitter/antenna at the calculated elevation. The EIRP curve is represented as a small number (N) of points each of which is an elevation (in radians) paired with an EIRP (in dBW): (ELEV$_i$, EIRP$_i$) for i=1,N
ELEV$_j$ is the highest elevation in the series of points that is less than the calculated elevation.

EIRPestimate=(elevation−ELEV$_j$)*(EIRP$_{j+1}$−EIRP$_j$)/(ELEV$_{j+1}$−ELEV$_j$)+EIRP$_j$ 5. Calculate estimated C/No for the mobile at this location. The C/No calculation uses constants based on the standard link budget calculation. The return link budget is attached for reference.
PathLossUp=20*Log 10(Range)+96.85 dB//assumes freq @1660 MHz
CNoUp=EIRPestimate−PathLossUp+GTTestimate+228.4 dB-Hz
CIoUp=EIRPestimate+42 dB-Hz
EIRPdown=EIRPEstimate−PathlossUp+GTTestimate+173 dBW
CNoDown=EIRPdown+64 dB-Hz
CNoTotal=−10*Log 10{10^(−CNoUp/10)+10^(−CIoUp/10)+10^(−CNoDown/10)}−0.09 dB-Hz 6. Select maximum encoding rate (MaxEncode) based on whether CNoTotal exceeds threshold for rate 0.75 or rate 0.5 encoding. Thresholds will be preloaded in modem (same thresholds for all terminals)

If (CNoTotal > Threshold75) then
    MaxEncode = 0.75
Elseif (CNoTotal > Threshold50) then
    MaxEncode = 0.50
Else
    MaxEncode = 0.33
Endif Typical transmission parameters on the forward link are:

| | |
|---|---|
| Channel Size | 5 KHz |
| Modulation | OQPSK (Offset Quadrature Phase Shift Keying) |
| Data Rate | 3000 symbols/sec |
| Coding Rate | 1/2 |
| Frame Size | 5 seconds |
| Sub-frame size | 0.5 seconds |

Typical transmission parameters on the return link are:

| | |
|---|---|
| Modulation | OQPSK |
| Data Rate | 900 symbols/sec |
| Coding Rate | 1/3, 1/2 or 3/4 |
| Transmission slot duration | 0.5 or 1 second |
| Slot Selection Algorithm | Slotted Aloha |

Figure 3:
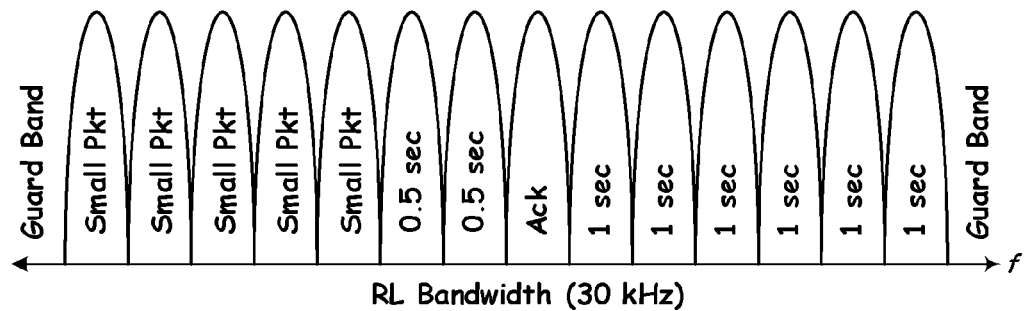
FIG. 3 shows the return link channel allocation;'

A typical return link configuration is shown in FIG. 3. The bandwidth available in a channel is divided into sub-channels. In this example, the 30 kHz bandwidth is divided into 2 kHz sub-channels. The configuration is modifiable and can be adjusted to traffic structure. The sub-channels can carry different types of data. In this example, some of the sub-channels carry small packets; others carry and 0.5 and 1.0 data packets. The packets are transmitted using slotted ALOHA random access. In slotted Aloha, frames are sub-divided into time slots, and the packets are transmitted at the beginning of time slots at random. In the event of a collision they are retransmitted at randomized times. Timeslots for forward link acknowledgement packets are pre-assigned based on forward link packet order. The acknowledgement packets consist of a fixed group of symbols forming a unique word, and the presence or absence of an acknowledgement depends on whether or not the symbol is transmitted in the assigned time slot.

Figure 4:
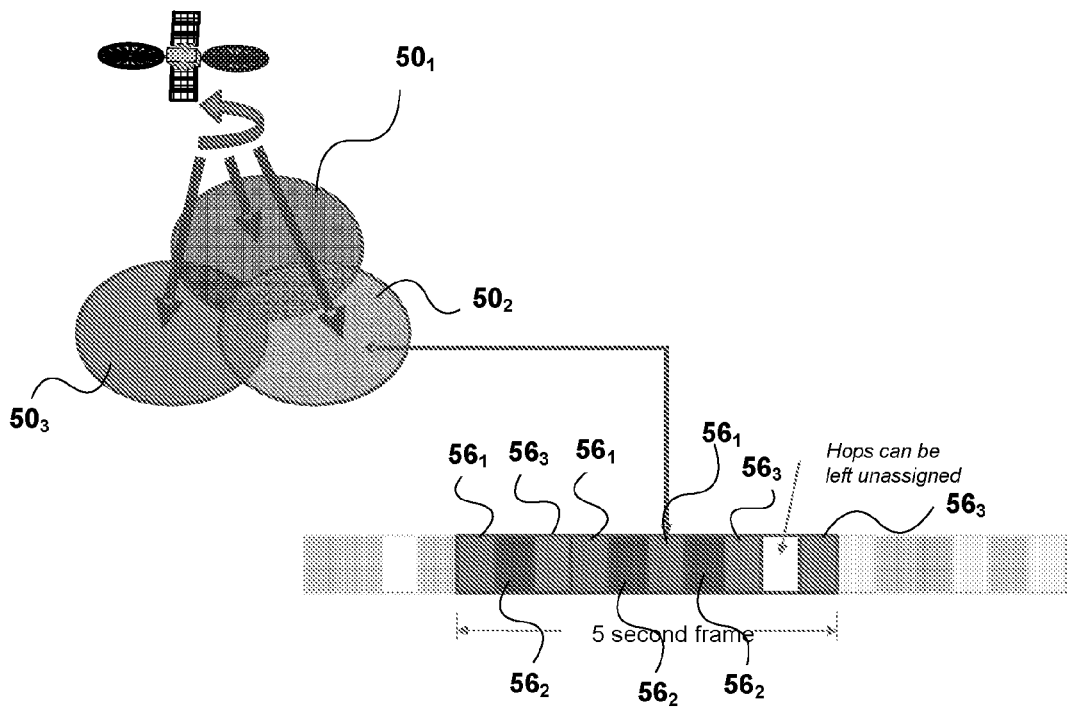
FIG. 4 shows the beam hopping pattern.

The forward link uses a beam hopping technique as shown in FIG. 4. Each five-second frame is divided into 0.5 second sub-frames 56, making a total of ten sub-frames per frame, and the sub-frames are assigned to a specific beam or left unassigned. In the example shown, the satellite has three overlapping beams $50_1$, $50_2$, $50_3$. Sub-frames $56_1$ are assigned to beam $50_1$, sub-frames $56_2$ are assigned to beam $50_2$ and sub-frames $56_3$ are assigned to beam $50_3$. Sub-frame 564 is left unassigned in this example. Each sub-frame can carry multiple packets addressed to a multiple mobile terminals.

As noted above, each subframe can be on a different satellite channel so that the forward link of the virtual carrier is defined by a particular channel/hop combination, where each subframe corresponds to a hop. For example, a virtual carrier might specify the forward link having the third subframe (hop) in the frame on a particular carrier frequency. Any particular subframe can carry a number of packets, as illustrated below, which can be addressed to the same or different terminals.

Each forward carrier can be hopped across satellite beams in a region. Each beam can have multiple hops in the BHP (beam hop pattern). In the extreme all 10 hops can be in one beam (i.e. no hopping). Hopping allows power efficient coverage to low traffic beams by limiting number of hops "turned on" in that beam.

Unlike the forward link, the return link is not beam hopped. Return link packets can be transmitted in any SF (except while the modem is receiving).

Each terminal modem selects the optimum beam based on its location, which it obtains from GPS data. In one example the modem selects the beam whose outer contour is furthest away. Alternatively, the modem may select the beam whose center is closest. The modem is configured with virtual carrier information, which determines the frequency/hop combination on the forward link. For example, if the modem selects beam $50_1$ based on its location, and it is assigned a particular virtual carrier, it will know to look for data in a particular sub-frame, for example the third sub-frame $56_1$ based on the location and virtual carrier ID.

Figure 5:
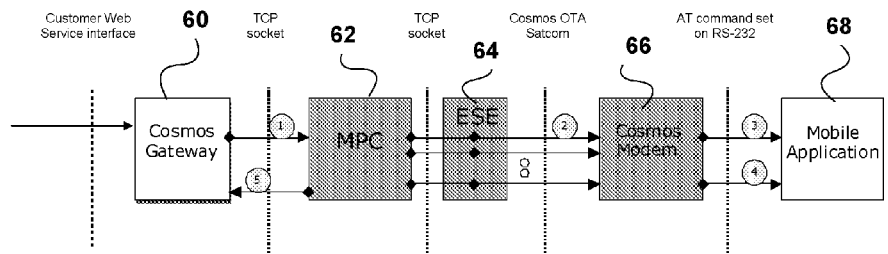
FIG. 5 illustrates the forward message flow.

The forward message flow can be understood with reference to FIG. 5. The Gateway 60 sends a message received on Web Services interface to the message processing center (MPC) 62. The MPC acknowledges the request. The MPC 62 queues the message and as space is available schedules fragments in subframes for the appropriate beam and hop based on the virtual carrier associated with the mobile modem.

The subframes are transmitted by the Earth Station equipment 64 to the modem 66. The modem 66 receives the subframes, extracts fragments addressed to it and acknowledges each on the TDMA ack subchannel. The ESE receives ack signals and forwards to the MPC 62 where they are mapped against fragments sent. The MPC 62 retries fragments as required.

On receipt of the first fragment the modem 66 indicates a message in progress status to the mobile (terminal) application 68. When all fragments are successfully received the modem indicates to mobile application 68 that the message is complete and can be retrieved by application. When all fragments are successfully acknowledged the MPC 62 sends delivery notification to the Gateway 60.

In the return message flow, the mobile (terminal) application sends return message request to the modem 66. This segments the message into packets (size determined by packet type/encoding rate selected for the message) and begins transmitting packets. The MPC 62 receives packets and creates acks for packet sets (all packets received in a 5 s interval). Acks are transmitted by the ESE 64 in the forward subframe. The modem retries packets as required.

When all fragments are successfully received then the MPC 62 passes the complete message to the Gateway 60, which stores the message for customer retrieval.

When all packets are successfully acknowledged the modem 66 provides delivery notification to the mobile application.

Figure 6:
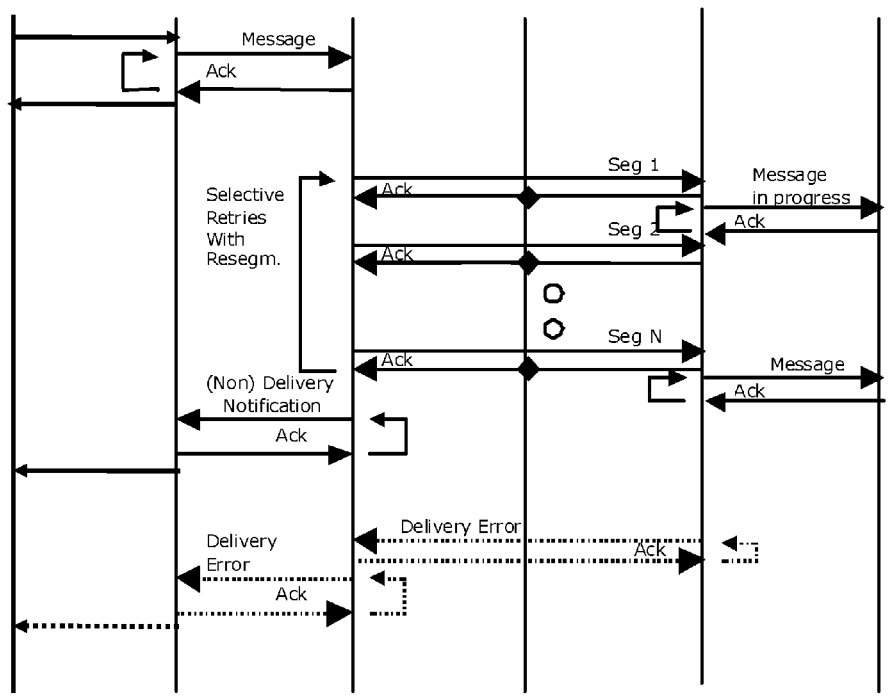
FIG. 6 shows a typical forward message sequence.
Figure 7:
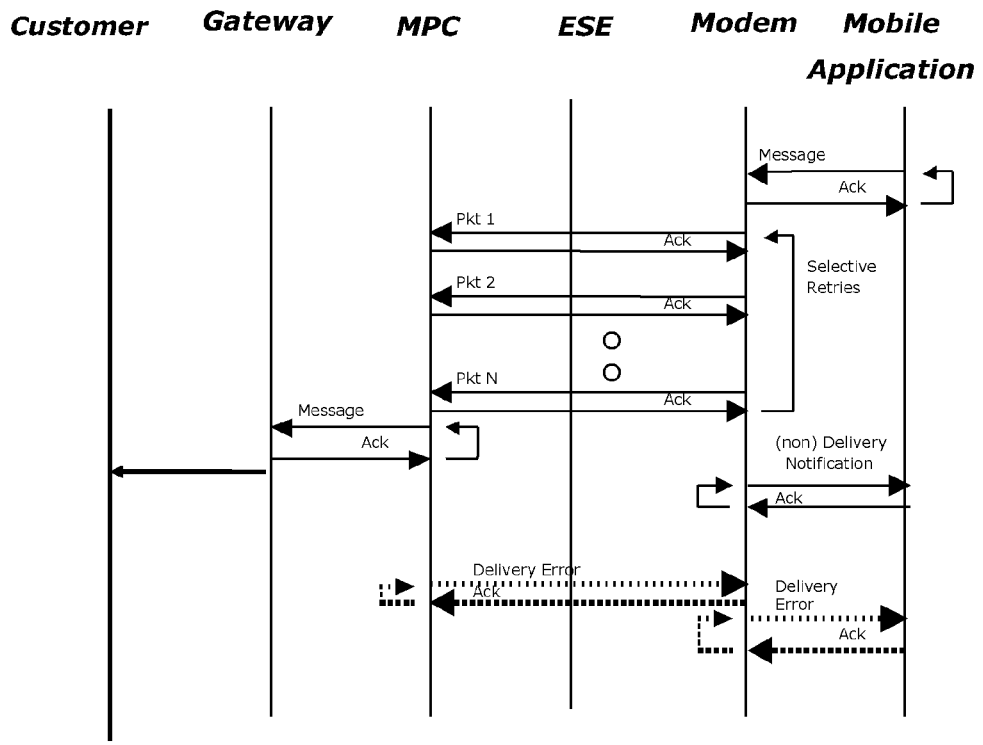
FIG. 7 shows a typical return message sequence.

FIG. 6 shows the forward message sequence between the network entities shown in FIG. 5. Likewise, FIG. 7 shows the return message sequence.

In order to update the modems with network configuration changes, for example, to the VC, it is necessary to broadcast information to all active terminals. In the broadcast message flow, the gateway 60 sends a broadcast message received on Web Services interface to the MPC 62. The MPC 62 acks the request. The broadcast can also be internally originated in MPC (e.g. Bulletin Board).

The MPC 62 queues the message on all required channels and beams (beams are determined and provisioned according to customer group). As space is available the MPC 62 schedules fragments in subframes for all hops associated with that beam. The subframes are transmitted by the ESE 64 to the modem 62.

All modems receive the subframe and extract fragments for Broadcast IDs to which they are subscribed. Broadcast packets are not acknowledged but the messages are repeated X times at Y second intervals by the MPC 62.

On receipt of the first fragment the modem 66 indicates a broadcast in progress status to the mobile (terminal) application 68. When all fragments are successfully received then the modem indicates to terminal application that the broadcast message is complete and can be retrieved by the application. When all repeats of the broadcast on all beams and hops are completed the MPC sends notification to the Gateway 60.

In order to efficiently disseminate broadcast messages, the individual modems are configured with a broadcast ID as well as a device ID. The device ID is used for identifying regular traffic addressed to that modem, but the broadcast ID is shared by a number of devices so that a broadcast message can be sent to all modems with the same broadcast ID simply by using that broadcast ID in the broadcast ID field.

Figure 8:
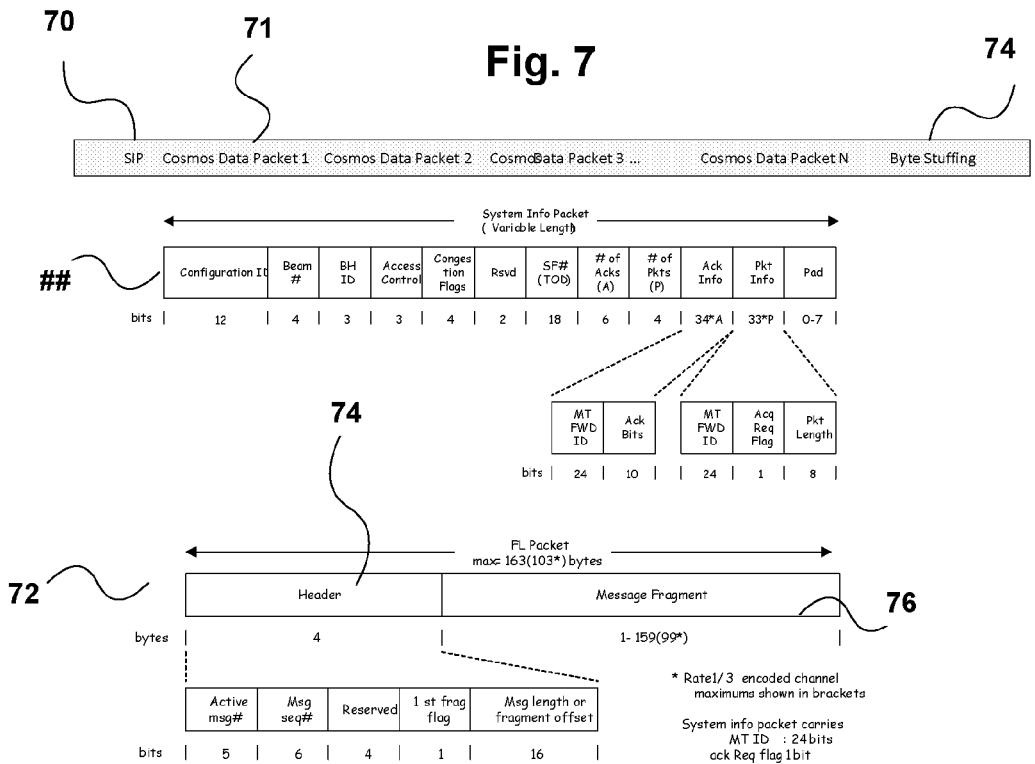
FIG. 8 shows the forward subframe format.

The forward link subframe format is shown in FIG. 8. This comprises a system information packet 70 in the header, a sequence of data packets 72 and any necessary byte stuffing 74 to fill the subframe.

The system information packet 70 is of variable length and includes a number of fields containing configuration ID, beam number and other relevant information including Ack info fields 71.

The forward link packets contain a header 74 and message fragment 76. The header contains relevant information including the active message number of which the message fragment contained in the packet forms part.

Figure 9:
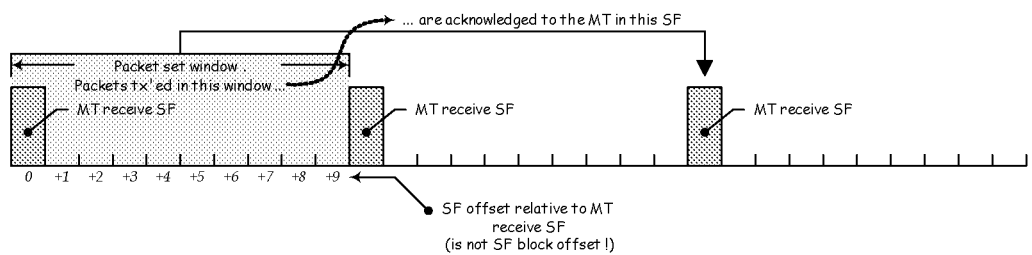
FIG. 9 shows a system information packet.
Figure 9:
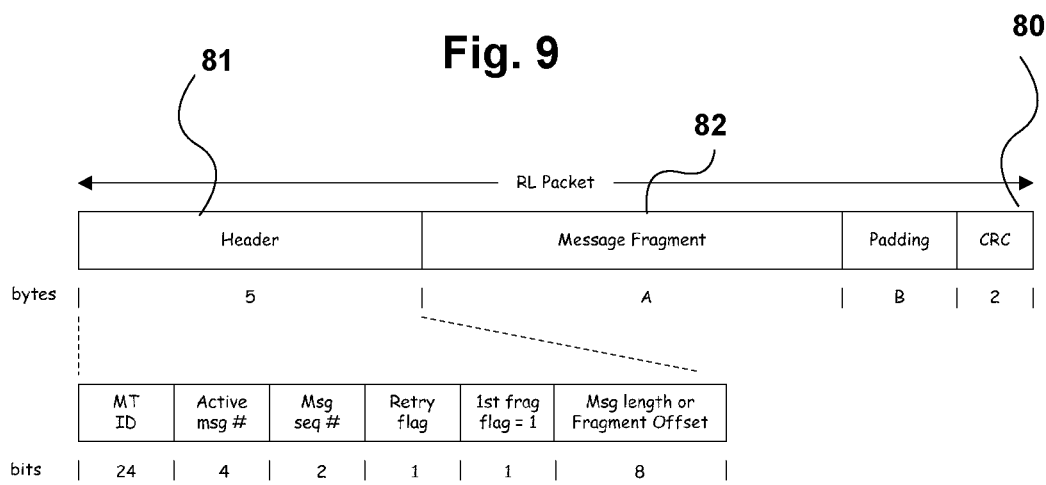

The SIP 70 acknowledges the receipt of return link packets in the ACK info field 71. The Ack info field is illustrated in FIG. 9. A bitmask indicates in which subframes data or small packets are received from the modem.

Figure 10:
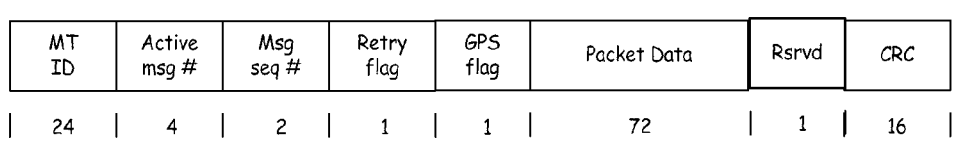
FIG. 10 shows the return link packet format both small and large packets.

FIG. 10 shows the return link uses two packet formats, a large format for multi-packet data messages and a short packet for short messages.

The large packets 80 contain a header 81 with the active message ID and message fragment 82 and are transmitted using a slotted Aloha protocol as described above.

The short packets in turn have two formats, namely a modem serial interface short packet and a modem generated position report.

Figure 11:
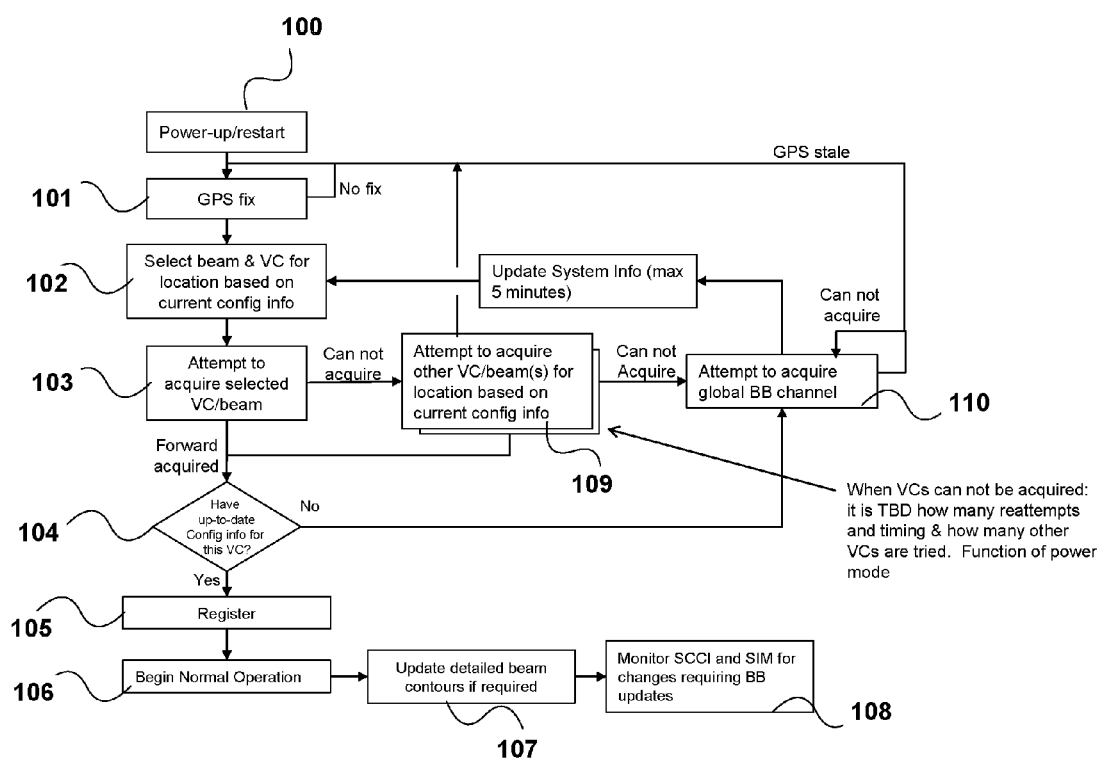
FIG. 11 is a flow chart showing a typical start-up sequence.

The operation of the invention will be better understood with reference to FIG. 11, which illustrates the start-up procedure for a terminal. Each mobile modem comes preconfigured with the configuration information for the network. This includes the virtual carriers available to it, where the virtual carries determine the frequency/hop combinations of the forward link and the frequencies of the return link.

After power up occurs at step 100, an attempt is made to obtain a GPS fix at step 101. Following a successful GPS fix, the modem selects a beam based on geographic location at step 102. In one embodiment, the modem will select the beam whose outer contour is furthest from the terminal. The modem also selects a VC based on the location. The VC determines the beam hop subframe in which the modem can anticipate receiving a packet addressed to it, the frequency, and the return link channel frequency.

For example, referring to FIG. 4, the location of the modem may prefer selection of beam $50_1$. The modem is preconfigured with a VC on this beam having a particular VCID, and this determines for example that the modem listen in the third subframe for that beam on a particular frequency channel. Likewise, the VCID determines the frequency of the return channel that the modem will use to send return packets using a slotted Aloha protocol. As noted, the return link packets are not beam hopped.

At step 103, the modem attempts to acquire the selected VC/beam. If the VC beam is acquired, a determination is made as to whether the modem has up-to-date configuration information at step 104. If yes, the modem registers with the system at step 105 and begins normal operation at step 106.

The modem determines if updated beam contours are required at step 107 and continually monitors incoming subframes for notice of configuration changes. If a notice of a configuration change is received, the modem listens for a bulletin board update to update its configuration. This may transmitted on a reserved common global channel, although the preference is for an in-service modem to receive the configuration updates on its traffic channel. If it cannot get into service on a traffic channel, it will move to the global beam channel.

If at step 103, the modem is unable to acquire a VC, the modem may attempt to acquire other VC/beams at step 109, and failing that attempts to acquire the global bulletin board channel at step 110.

When a mobile device moves from one satellite beam to another, the mobile device detects beam switches by monitoring signal quality and comparing the quality with nearby beams. The beams that are compared are based on GPS location, which is updated periodically (current embodiment is once every 12 hours). The mobile forces a GPS fix, even if the user application has turned off the GPS. The mobile switches to the new beam once the average signal strength of the new overlapping beam exceeds the current signal strength by a margin of at least 1 dB, After the mobile switches beams, it sends a beam change notification message to the Gateway. The beam switch registration message lets the Gateway know which beam to use when sending a to-mobile message.

All mobile devices transmit a system registration message when powered on. In addition to the system registration, the mobile terminal also transmits an application registration message. The application registration contains the terminal's application firmware version number and its configuration information.

The application registration message is delivered to the customer and the customer is invoiced for this message. The application registration message can be programmed to be sent after power-up or only if the reported version and configuration has changed from the last report.

The invention claimed is:

1. A satellite-based messaging system wherein messages are exchanged between a ground station and mobile terminals over a wide geographic area covered by multiple satellite beams, and wherein each beam contains one or more carrier frequencies, comprising a message processing center configured to:

provision a frame comprising a plurality of subframes over a forward link to the mobile terminals, said subframes being capable of carrying one or more data packets addressed to one or more said mobile terminals;

hop between beams in the forward link within each frame and assign each subframe within a frame carrying data packets to a specific satellite beam, whereby each subframe carrying data packets corresponds to a carrier frequency/beam hop combination;

provision a transport medium in the form of virtual carriers, each virtual carrier being defined by a forward link comprising one or more particular carrier frequency/beam hop combinations and a shared return link, and wherein each virtual carrier is assigned a unique virtual carrier identifier; and notify the mobile terminals of carrier frequency/hop combinations for assigned virtual carrier identifiers.

2. A satellite-based messaging system as claimed in claim 1, wherein each virtual carrier extends across multiple beams and comprises different combinations of carrier frequency/beam hop for each beam.

3. A satellite-based messaging system as claimed in claim 2, wherein for each virtual carrier the carrier frequency remains the same while the beam hop changes across the various beams.

4. A satellite-based messaging system as claimed in claim 3, wherein the message processing center is configured to transmit to each mobile terminal on the same virtual carrier regardless of beam unless a request is made to change the virtual carrier.

5. A satellite-based messaging system as claimed in claim 4, wherein the message processing center is configured to include a system configuration change indicator in each subframe to notify the mobile terminals of the existence of changes in the configuration of the virtual carriers and the need to listen for system update information.

6. A satellite-based messaging system as claimed in claim 3, wherein the message processing center is configured to periodically broadcast bulletin boards to the mobile terminals detailing changes in virtual carrier configurations.

7. A satellite-based messaging system as claimed in claim 6, wherein the bulletin boards are broadcast on a common frequency hopped between global coverage regions, each with multiple beams.

8. A satellite-based messaging system as claimed in claim 2, wherein different carrier frequencies are assigned for the return link of a virtual carrier in different beams.

9. A satellite-based messaging system as claimed in claim 1, wherein the return link carrier is sub-channelized into increments so that traffic capacity can be changed by adding or subtracting subchannels having configurable bandwidth.

10. A satellite-based messaging system as claimed in claim 1, wherein the return link is a slotted random access link in terms of time and selection of subchannels.

11. A satellite-based messaging system as claimed in claim 1, wherein the message processing center is configured to select a coding rate depending at least in part on the quality of the satellite link.

12. A satellite-based messaging system as claimed in claim 11, wherein the coding rate depends at least on an equivalent isotropic radiation pattern for the mobile terminals.

13. A satellite-based messaging system as claimed in claim 1, wherein acknowledgements are based on which time-slots an acknowledgement packet is sent in.

14. A satellite-based messaging system as claimed in claim 13, wherein acknowledgements are assured by the transmission of acknowledgement packets that comprise a fixed symbol stream, wherein the acknowledgement information is determined by which time slot contains the acknowledgement packet.

15. A mobile terminal for exchanging messages over a satellite-based messaging system with a ground station over a wide geographic area covered by multiple satellite beams, wherein each beam contains one or more carrier frequencies, wherein the messages are transmitted in the forward link in a frame comprising a plurality of subframes capable of carrying one or more data packets addressed to one or more mobile terminals, wherein the subframes carrying data packets within each frame are hopped between beams, each subframe carrying data packets corresponding to a carrier frequency/beam hop combination, and wherein virtual carriers defined by a forward link comprising one or more particular carrier frequency/beam hop combinations and a shared return link are assigned a unique virtual carrier identifier, and wherein the mobile terminal is configured to:
  store virtual carrier configurations over a wide geographic area;
  select a virtual carrier based on current location and stored configuration information of available virtual carriers; and
  attempt acquisition of the selected virtual carrier to initiate device registration and the stored configuration information.

16. A mobile terminal as claimed in claim 15, wherein the mobile terminal is configured to attempt acquisition of an alternate virtual carrier in either the same or a different beam if available upon failure to acquire the selected beam.

17. A mobile terminal as claimed in claim 15, which is configured to listen to a bulletin broadcast to update configuration information in the event of acquisition failure.

18. A mobile terminal as claimed in claim 15, which is preconfigured with stored virtual carrier frequency/hop combinations.

19. A mobile terminal as claimed in claim 15, wherein the mobile terminal is configured to register with a remote message processing center over a slotted random access non-hopped return channel prior to receiving messages from the system wherein in response to virtual carrier acquisition.

20. A mobile terminal as claimed in claim 15, which upon moving between beams is configured to
  listen for incoming data addressed to the terminal over a forward link on a specific frequency/hop combination associated with the virtual carrier assigned to the terminal based on the current geographic location or change virtual carrier if conditions warrant.

21. A mobile terminal as claimed in claim 15, which is configured to listen for a bulletin board update in response to an indication of a configuration change a subframe header.

22. A mobile terminal as claimed in claim 15, which is configured to select a beam whose center is closest to the location of the mobile terminal and select a virtual carrier on that beam.

23. A mobile terminal as claimed in claim 15, which is configured to select a beam whose center is furthest inside the outer contour of the beam to the location of the mobile terminal and select a virtual carrier on that beam.

24. A mobile terminal as claimed in claim 15, wherein the virtual carrier serving that terminal is selected to share the terminals among several virtual carriers serving that beam.

25. A mobile terminal as claimed in claim 15, which is configured to transmit messages on a slotted random access basis over said shared return link on a frequency assigned to the selected virtual carrier.

26. A mobile terminal as claimed in claim 15, which is configured to vary the coding rate on the return link depending at least in part on the quality of the satellite link.

27. A mobile terminal as claimed in claim 26, wherein the coding rate depends at least in part on an equivalent isotropic radiation pattern for the mobile terminals.

28. A mobile terminal as claimed in claim 15, which is configured to send acknowledgement packets for forward link packets in pre-assigned time slots based on forward link packet order.

29. A method of sending messages over a satellite system wherein messages are exchanged between a ground station and mobile terminals over a wide geographic area covered by multiple satellite beams, and wherein each beam contains one or more carrier frequencies, comprising:
  provisioning a frame comprising a plurality of subframes to carry data over a forward link to the mobile terminals, said subframes being capable of carrying one or more data packets addressed to one or more said mobile terminals;
  hopping between beams in the forward link within each frame and assigning each subframe carrying data packets within a frame to a specific satellite beam, whereby each subframe carrying data packets corresponds to a carrier frequency/beam hop combination;
  provisioning a transport medium in the form of virtual carriers each defined by one or more particular carrier frequency/beam hop combinations and a shared return link, wherein each virtual carrier is assigned a unique virtual carrier identifier; and
  notifying the mobile terminals of carrier frequency/hop combinations for assigned virtual carrier identifiers.

* * * * *